UNITED STATES PATENT OFFICE.

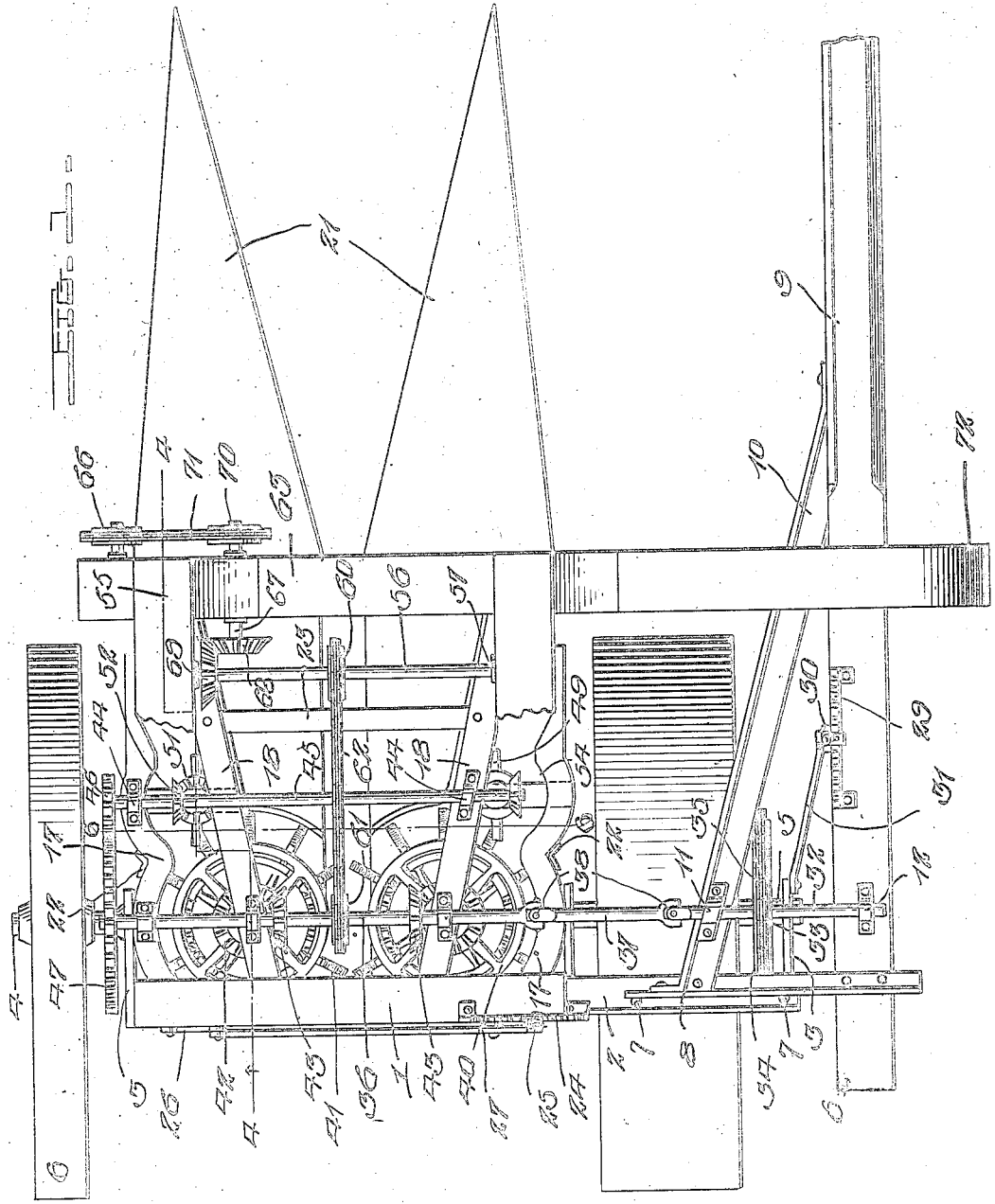

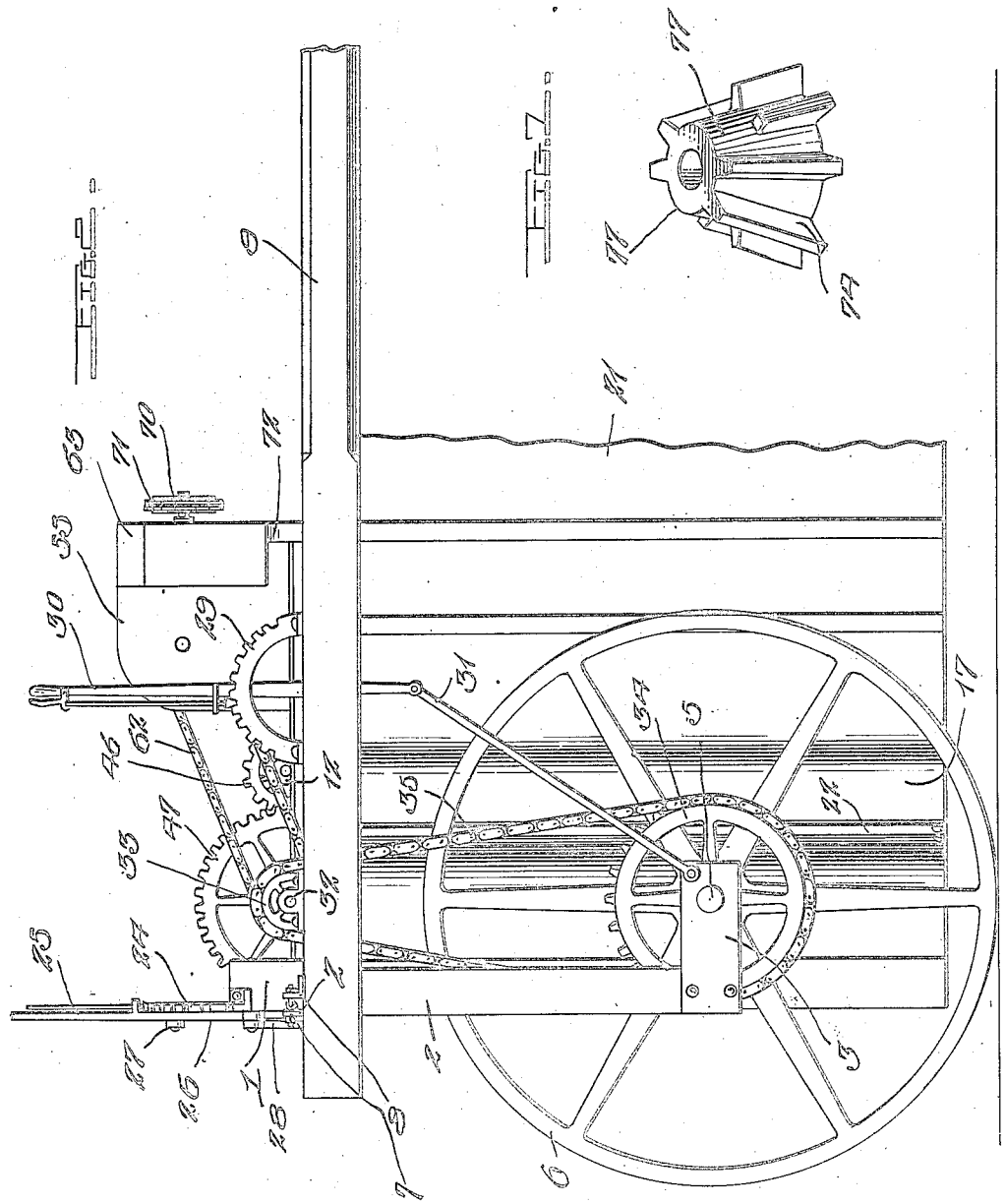

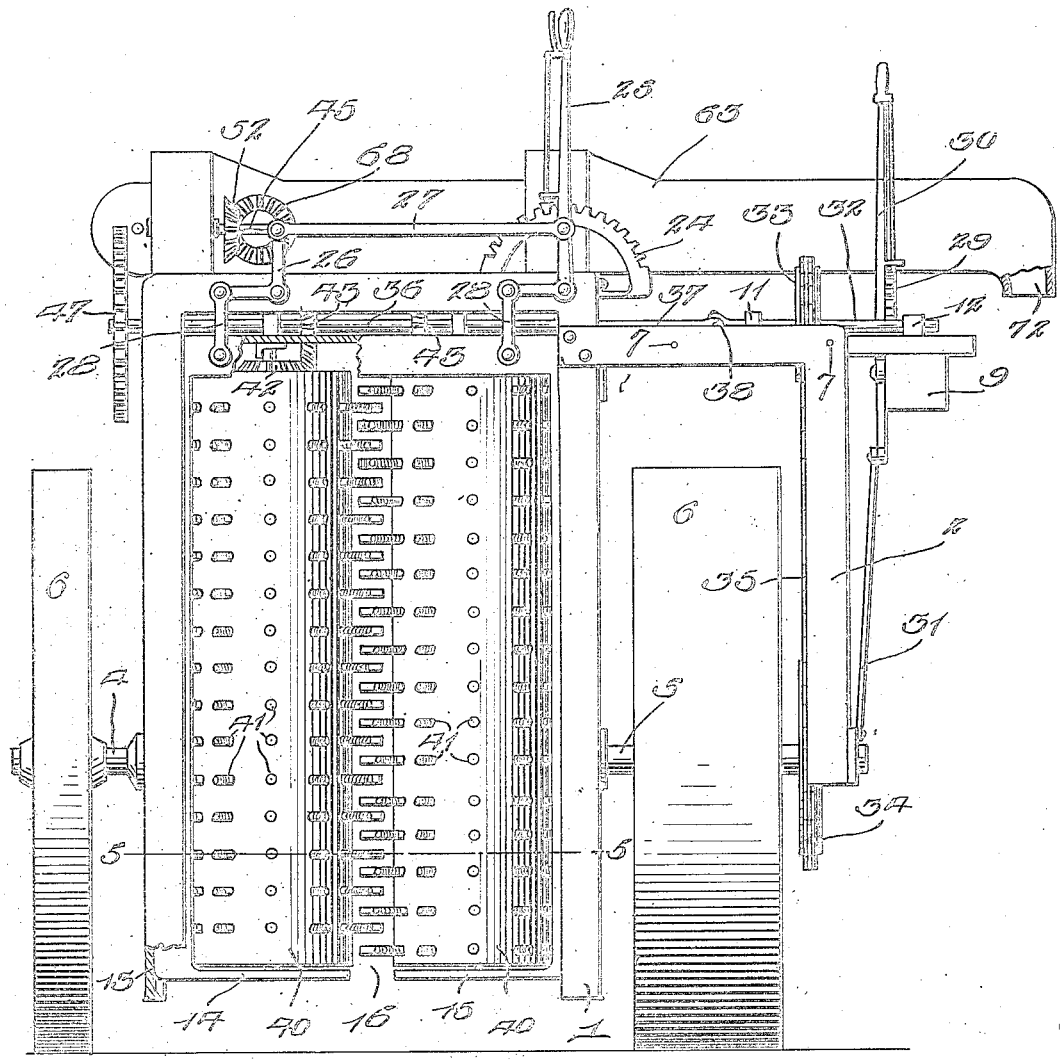

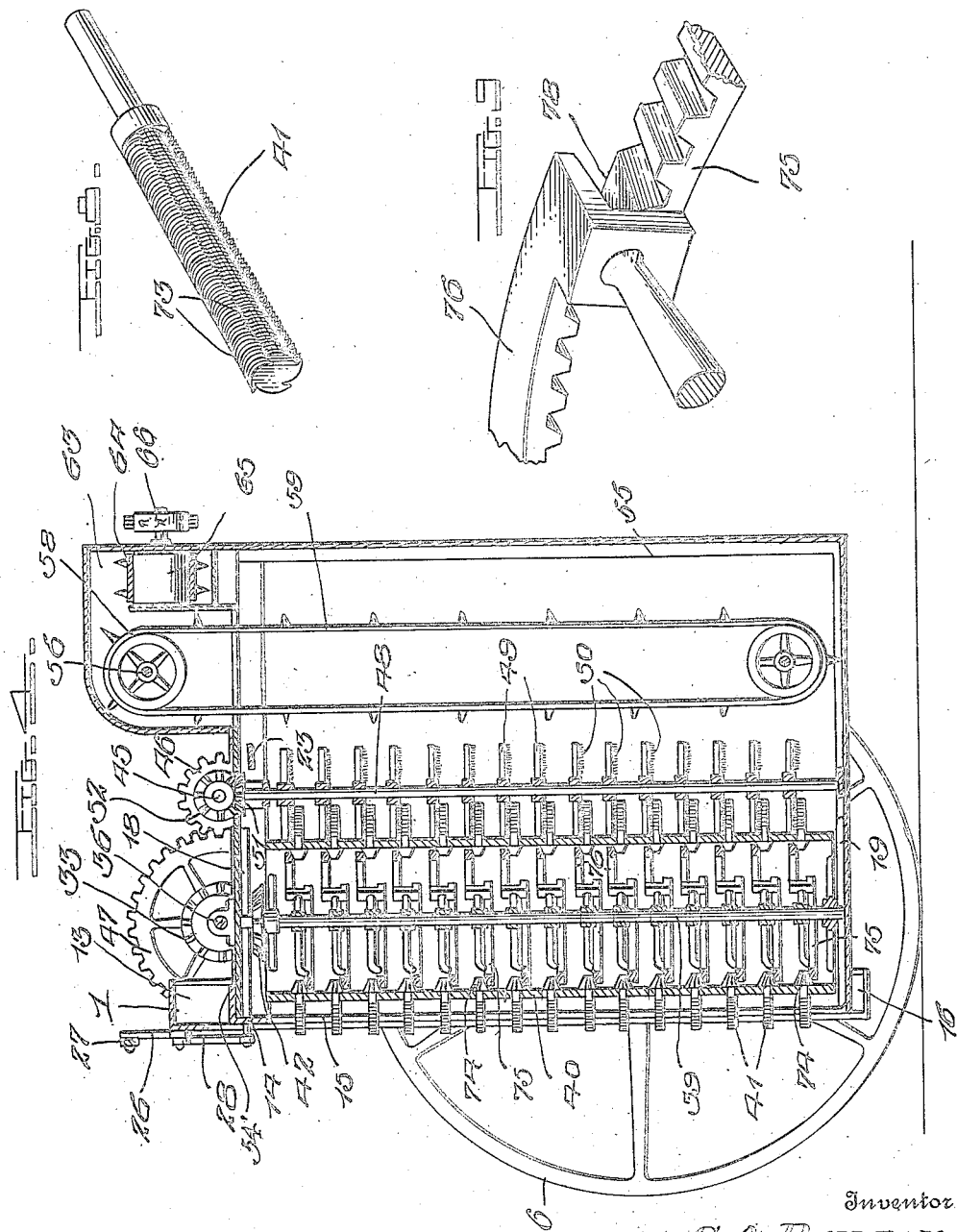

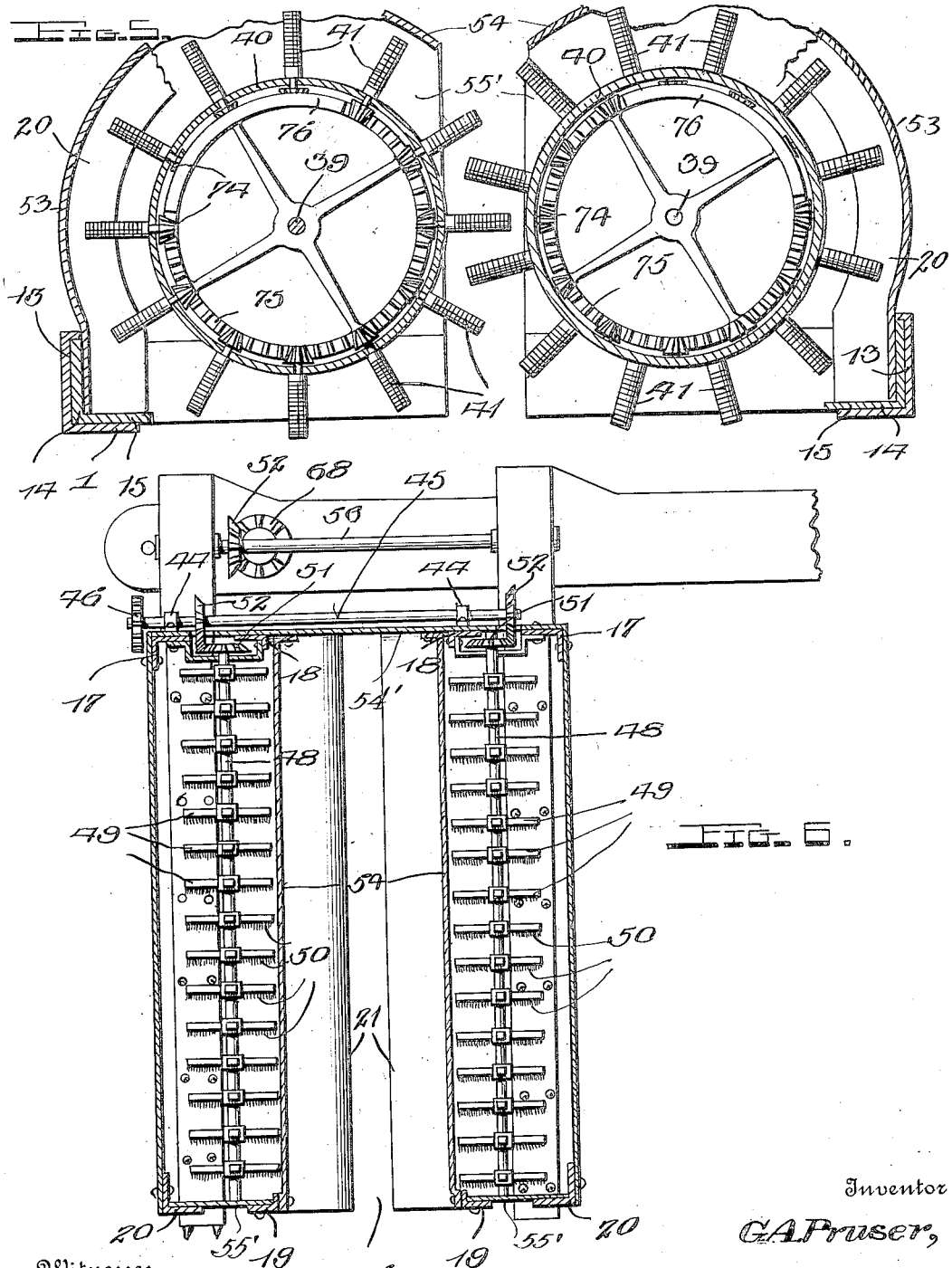

GUSTAV A. PRUSER, OF WINTERS, TEXAS.

COTTON-PICKING MACHINE.

1,134,158.	Specification of Letters Patent.	Patented Apr. 6, 1915.

Application filed July 6, 1912. Serial No. 708,045.

*To all whom it may concern:*

Be it known that I, GUSTAV A. PRUSER, a citizen of the United States, residing at Winters, in the county of Runnels and State of Texas, have invented certain new and useful Improvements in Cotton-Picking Machines, of which the following is a specification, reference being had to the accompanying drawings.

This invention relates to an improvement in automatic cotton picking machines, and the primary object of the present invention is to provide a pair of picking drums which rotate in one direction relative to the rows of cotton and which are provided with a plurality of picking fingers which, when coming in contact with the cotton, will wind the same upon the fingers, but when coming within the discharge chamber, the fingers will be rotated in the opposite direction, thereby discharging the cotton within the chambers.

A further object of the present invention is to provide a device of this character with a main wheel frame to which the draft appliance is applied and having slidably mounted therein a supplemental frame carrying the picking mechanism which may be raised and lowered in gathering the cotton.

Other objects will appear hereinafter as the description continues.

With the above and other objects in view, this invention consists generally of the wheeled frame having vertically sliding within the same, a supplemental frame carrying the picking mechanism which is operated through the instrumentality of the supporting wheels and chambers mounted within the supplemental frame for receiving the cotton after it has been picked by the picking mechanism which in turn will convey the same to a conveyer to be emptied in some suitable receptacle.

This invention further consists of the novel details of construction, combination, formation and arrangement of parts as will be hereinafter more fully described, claimed and particularly pointed out in the drawings, in which:—

Figure 1 is a plan view with a portion of the casing broken away to show the mechanism embodying my invention. Fig. 2 is a side elevation of the same having a portion thereof broken away. Fig. 3 is an end elevation. Fig. 4 is a longitudinally extending section taken on the line 4—4 of Fig. 1. Fig. 5 is a horizontal section taken on the line 5—5 of Fig. 3. Fig. 6 is a vertical transverse section taken on the line 6—6 of Fig. 1. Fig. 7 is a perspective view of a pinion which is mounted on the inner end of each of the picking fingers. Fig. 8 is a detail perspective view of one of the picking fingers as applied to a portion of one of the drums, and Fig. 9 is a detail view of the gear rack.

Reference now being had to the accompanying drawings wherein like parts are illustrated by like numerals throughout the several views, the numeral 1 indicates the main U-shaped frame which is made preferably of angle iron and has extending therefrom an auxiliary L-shaped frame 2 also made of angle iron, having one arm secured adjacent the upper end of one side of the main frame. The depending portions of each of the said frames are provided with horizontal extensions 3, one of which having secured thereto a stub axle 4, whereas the other two extensions are connected by means of an axle 5. Ground wheels 6 which support these frames are mounted upon the axles 4 and 5.

Hingedly secured to the transverse portion of the auxiliary bar 2 as at 7, is an angle bar 8 which has permanently secured to its outer extremity the tongue 9 to which the draft attachment is applied for propelling the device over the field. A diagonally extending brace rod 10 connects the angle plate 8 with the tongue 9 and has mounted thereon a bearing block 11 which is in alinement with the bearing block 12 formed upon the tongue, for a purpose which will be hereinafter described.

The main frame 1 is provided with a suitable guide way 13 in which is slidably mounted a supplemental frame 14. This supplemental frame comprises a rear portion 15 which is substantially rectangular in shape and made of angle iron and provided at its lower extremity with an opening 16 through which the cotton passes when the machine is being carried over the field. Extending longitudinally from the upper portion of this portion 15 of the auxiliary frame is a pair of parallel extending end braces 17 and a pair of oppositely extending diagonal rods 18, each of these rods also being made preferably of angle iron. A pair of diagonally extending brace rods 19 extend also from this portion 15 of the frame 14 adjacent the lower extremity thereof and are similar to the brace rods 18, whereas a pair of end rods 20 extend from the lower portion of the member 15 but are considerably longer than the side bars 17 for supporting the usual gatherers or guides 21 which are mounted upon the forward end thereof in any well known, or preferred manner. These bars 17, 18, 19 and 20 are braced by suitable vertically extending rods 22 and transversely extending rods 23.

To provide means for raising and lowering the supplemental frame, I pivotally mount upon the outer face of the U-shaped frame 1 a hand operating lever 25 and a bell crank 26 which are connected to the supplemental frame by links 28. The bell crank 26 is connected to the hand operating lever by means of a rod 27, whereby operation of the said lever will cause the supplemental frame to be raised and lowered as desired. This hand operating lever 25 is provided with a spring actuated pawl for engaging a segmental rack formed upon a bracket 24 mounted upon the upper face of the U-shaped frame, whereby the said supplemental frame may be held in a raised or lowered position as desired.

To provide for tilting the forward end of the supplemental frame so that the gatherers 21 may be raised and lowered, I provide upon the tongue 9 a bracket 29 which has fulcrumed thereto a lever 30, the lower extremity of this lever being connected to the extension 3 mounted upon the depending portion of the auxiliary frame by means of a link 31, so that by operating this lever the main frame, as well as the supplemental frame, may be tilted as the angle plate 8 is hingedly mounted upon the auxiliary frame 2, as before described. This lever 30 is also provided with a spring actuated pawl adapted to engage the segmental rack mounted upon the bracket 29, whereby the forward end of the frame may be held in adjusting position, as desired.

Mounted within the bearings 11 and 12 is a transversely extending shaft 32 which has mounted thereon a sprocket wheel 33 and which is connected to a sprocket wheel 34 mounted upon one of the ground wheels 6 by means of a sprocket chain 35, whereby when the device is being propelled over the field, the ground wheels will impart a rotary motion into the shaft 32, which is connected to the picker mechanism for operating the same. Mounted within the bearings formed upon the side members 17 is a transversely extending shaft 36 which is connected to the shaft 32 by means of an auxiliary shaft 37, these shafts being connected by means of knuckle joints 38, so that the supplemental frame may be raised and lowered as desired, without interfering with the operation of the machine.

Fixed within the diagonal members 18 of the supplemental frame and adjacent the rear extremity thereof, is a pair of vertically extending shafts 39 each having mounted thereon a drum 40. Each of these drums comprises a plurality of sections having mounted therein picking fingers 41 which will be hereinafter more fully described. Permanently secured upon the upper face of each of these drums 40 is a conical gear 42 which is operatively connected to the shaft 36 by means of beveled gears 43, whereby as the shaft 36 is rotated it will also impart a rotary motion to the said drums, thereby causing the same to operate in opposite directions relative to the rows of cotton. Journaled within bearings 44 secured upon the members 17 and 18 of the supplemental frame is a shaft 45 which extends parallel with the shaft 36 and is operatively connected thereto by means of a pinion 46 meshing with a gear 47 mounted upon one end of the shaft 36. A pair of vertically extending shafts 48 is journaled within bearings formed on the outer face of the diagonally extending members 18 and have mounted thereon series of brushes 49 comprising a plurality of radially directed blades having bristles 50 depending therefrom. The upper end of each of these shafts is provided with a conical gear 51 adapted to mesh with a beveled gear 52 secured upon the shaft 45. This supplemental frame is partly inclosed with a pair of casings which are spaced apart to allow the cotton to pass between and each of which comprises a semi-circular portion 53 which encircles the picking drums, a central portion 54 which covers the rotary brush and which terminates in a forward extension 55 in which an endless conveyer is mounted, and each casing is covered by parallel upper and lower tops 54' and a bottom 55'. These casings are made preferably of sheet metal and are secured to the brace members of the supplemental frame in any preferred manner, or as shown. It is to be noted that the forward end of each casing is closed and that the rear end thereof is opened to allow the picking fingers to come in contact with the cotton. Adjacent the forward extremity of this frame is mounted a transversely extending shaft 56 which is journaled within bearings 57 mounted within the forward end of the casing and have mounted on the extremities thereof pulleys 58 which carry endless belts 59 provided with outwardly directed conical cotton supporting studs 59'. The upper shaft 56 is provided with a sprocket wheel 60 connected with the sprocket wheel 61 mounted upon the shaft 36 by means of a sprocket chain 62 which will also impart a rotary motion into the shaft 56 for operating the endless conveyers.

The forward extremity of the supplemental frame is provided with a horizontal transversely extending casing 63 communicating with the upper end of the casing 55, and in which is mounted a conveyer belt 64. This conveyer belt extends over pulleys 65 mounted on shafts journaled within the extremities of the frame and one of these shafts has mounted on the outer extremity thereof a sprocket wheel 66. Extending through the casing 63 adjacent one end thereof and journaled within suitable bearings formed thereon is a shaft 67, one end of which is provided with a beveled gear 68 adapted to mesh with the beveled gear 69 mounted upon the shaft 56, whereas the opposite end of the shaft 67 is provided with a sprocket wheel 70 which is connected with the sprocket wheel 66 by means of a sprocket chain 71 which provides obvious means for operating the endless belt 64. One extremity of this casing 63 is provided with an exhaust opening 72 through which the cotton is emptied in any suitable receptacle, not shown.

The picking fingers 41 encircle the periphery of each of the drums in a substantially circular line and each is journaled within its respective drum. The outer extremity of each of these picking fingers is serrated as at 73 which provides suitable gripping means to gather the cotton when the finger is being rotated, and the opposite extremity thereof has mounted thereon a pinion 74. Each of the shafts 39 has fixed thereon a plurality of circular rack bars 75 having teeth formed upon the upper face thereof which mesh with the teeth of the pinions 74, so that when the drums are rotated the picking fingers will also be rotated in one direction. It is apparent from this construction that as the drums rotate when they come in contact with the cotton the fingers will wind the same thereupon, which will carry the cotton to the discharge chambers and to provide means for unwinding the cotton from the fingers when they come in contact with the discharge chambers, I provide an inverted portion 76 of the rack bars 75, so that as the fingers come in contact with the inverted portions they will be rotated in an opposite direction, thereby unwinding the cotton and as the bristles 50 of the rotary brushes come in contact with the fingers they will brush the cotton from the fingers and deposit the same in the forward portion of the chamber, from which it is then carried by the vertically extending endless conveyer 59, to the transversely extending conveyer 64, as described. The pinions 74 are provided with smooth portions 77 which engage with the smooth track portion 78 of the rack gears 75, so that the fingers will be held in a stationary position during the time between the changes in direction of rotation of said fingers.

It is obvious from the foregoing description, taken in connection with the accompanying drawings, that as the device is propelled over the field, the gatherers 21 will direct the rows of cotton between the rotating drums provided with picking fingers. The picking fingers will then gather the cotton as they come in contact with the same and when the drums are further rotated, the fingers will be rotated in an opposite direction, thereby causing the same to drop the cotton within the discharge chambers and as the brushes rotate in a rapid speed, they will brush the cotton from the fingers against the endless belts 59 which in turn will convey the same up to the conveyer 64, by means of which it is conveyed to a receptacle as before described. It will be understood that the outwardly directed conical cotton supporting studs 59' catch and support the cotton against the endless belts 59 while the cotton is being elevated by said belts.

It will be further apparent that an automatic cotton picking machine of this character will be compact in the arrangement of parts, simple in operation and inexpensive in the cost of manufacture, and it is to be understood that whereas I have shown a specific embodiment of the present invention, other minor details as to changes in form and construction may be resorted to that come within the scope of the present invention without departing from the spirit thereof.

What I claim is:—

1. In a cotton picking machine, the combination with a rotary drum, of a stationary circular rack mounted therein, said rack comprising a pair of segments disposed in relatively different horizontal planes, the ends of said segments overlapping each other and being connected together, fingers journaled within said drum, pinions mounted on the inner ends of said fingers, the under face of the uppermost segment of the rack being formed with teeth to engage the pinions during a portion of the revolutions of the drum, the upper face of the lower segment of the rack being provided with teeth for engagement with the pinions during the remainder of each revolution of the drum, whereby said fingers will be rotated in reverse directions upon each revolution of the drum, and the opposing faces of the overlapping portions of the segments being smooth whereby the fingers will be allowed to cease rotation in one direction before rotation in the opposite direction.

2. In a cotton picking machine, the combination with a rotary drum, of a stationary circular rack mounted therein, said rack comprising a pair of segments disposed in relatively different horizontal planes, the ends of the segments overlapping each other and being connected together, fingers journaled within the drum, pinions mounted on the inner ends of said fingers, the under face of the uppermost segment of the rack being formed with teeth to engage the pinions during a portion of the revolution of the drum, the upper face of the lower segment of the rack being provided with teeth for engagement with the pinions during the remainder of each revolution of the drum, whereby said fingers will be rotated in reverse directions upon each revolution of the drum, the opposing faces of the overlapping portions of the segments being smooth, and portions of diametrically opposed teeth of said pinions being cut away to form smooth portions on the pinions, the smooth portions on the pinions being adapted to engage between the smooth portions of the segments, whereby the pinions will be held against rotation during the time between the changes in the direction of rotation thereof.

3. A device of the class described comprising a main frame, an axle projecting from said main frame, wheels mounted upon said axle, an auxiliary frame suspended from the main frame, means for retaining the auxiliary frame in position, means for adjusting the auxiliary frame, drums mounted in the auxiliary frame, shafts mounted in the auxiliary frame, picking fingers carried by the drums, brushes carried by the shafts above the picking fingers to unwind material from said picking fingers as the latter pass beneath the brushes, means for operating the drums, means for operating the shafts from the drum operating means, plant guide members forwardly of the drums, means for rotating said fingers independently of the drums, said guide members being hollow to form material receiving compartments, the lowermost compartment being adapted to receive the material unwound from the picking fingers, a transverse tube above the inner ends of the hollow guide members, means for conveying the material from the lowermost compartment to the transverse tube, and means within the transverse tube for conveying the material to one open end thereof and depositing said material in a receptacle beneath said opening.

In testimony whereof I hereunto affix my signature in the presence of two witnesses.

GUSTAV A. PRUSER.

Witnesses:
MARSHAL F. LETT,
WILLIAM H. CAIN.